UNITED STATES PATENT OFFICE.

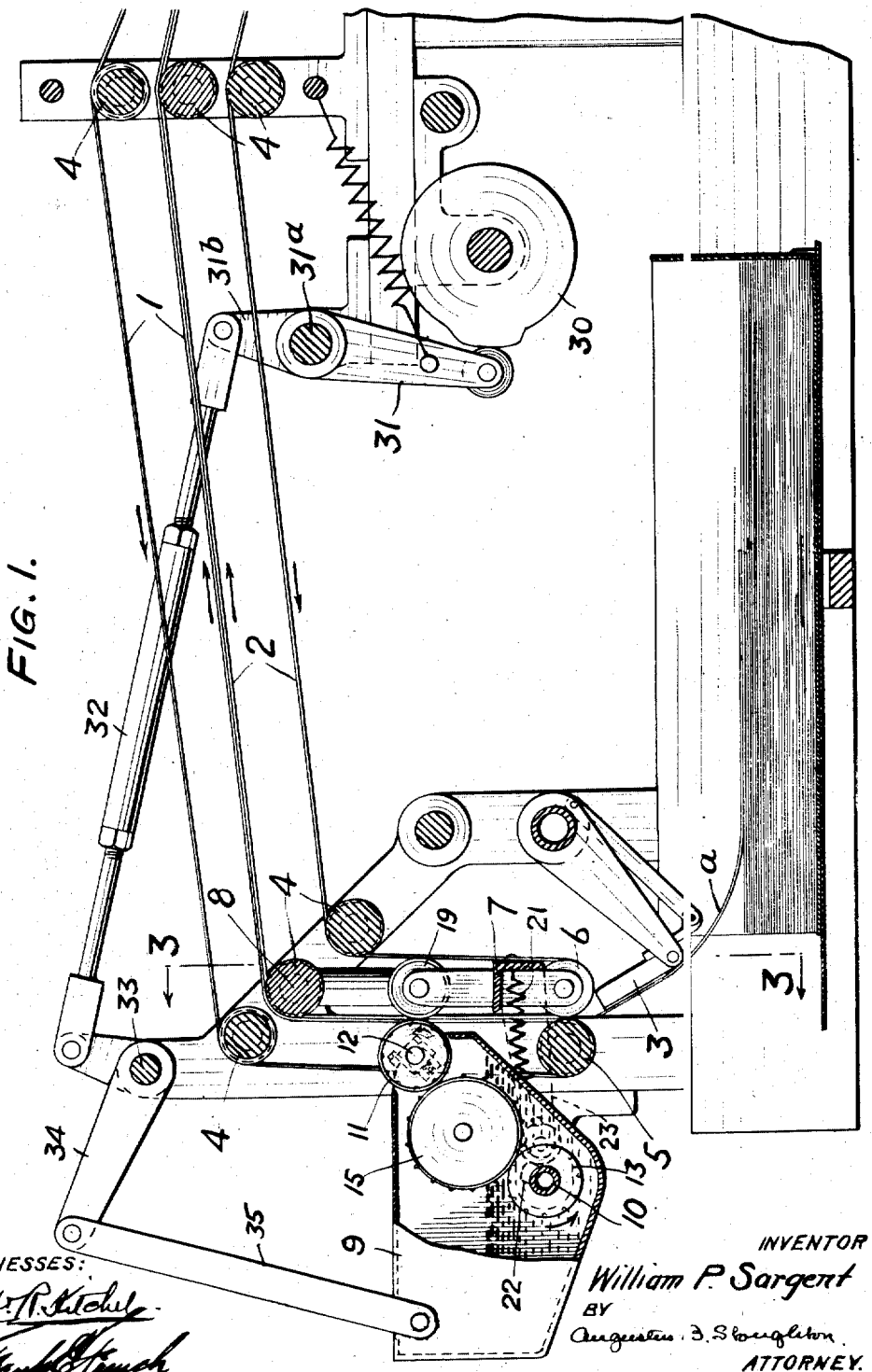

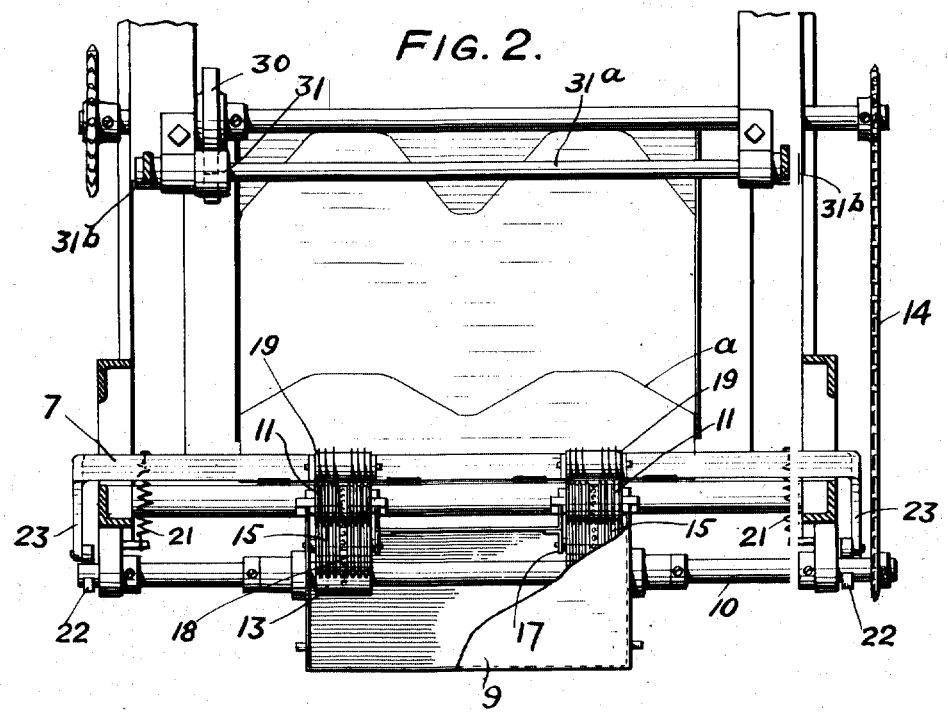
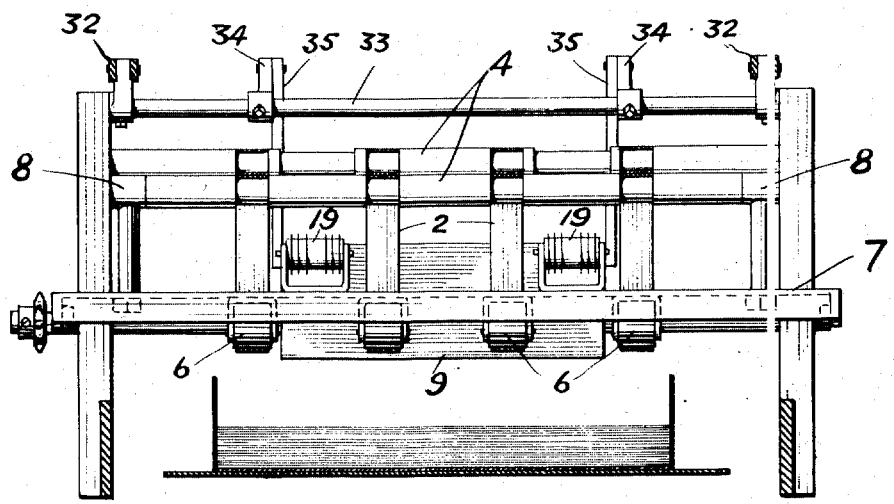

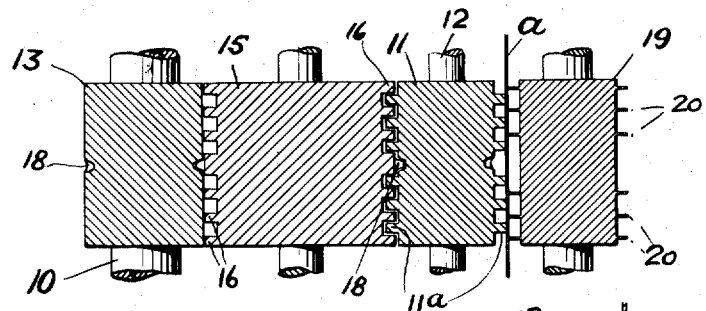
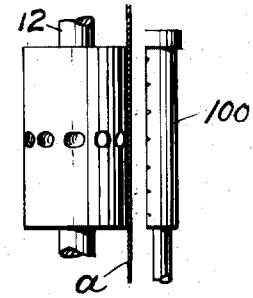
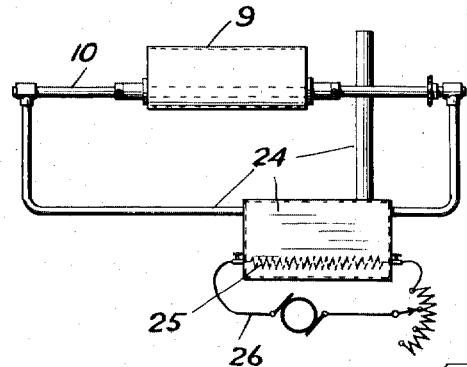
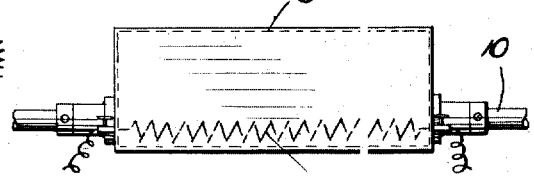
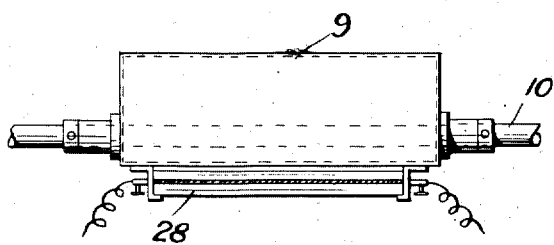

WILLIAM P. SARGENT, OF PHILADELPHIA, PENNSYLVANIA, ASSIGNOR TO THE CURTIS PUBLISHING COMPANY, OF PHILADELPHIA, PENNSYLVANIA, A CORPORATION OF PENNSYLVANIA.

PASTER FOR WRAPPERS AND THE LIKE.

1,008,616. Specification of Letters Patent. Patented Nov. 14, 1911.

Application filed July 20, 1911. Serial No. 639,579.

*To all whom it may concern:*

Be it known that I, WILLIAM P. SARGENT, a citizen of the United States, and a resident of Philadelphia, in the county of Philadelphia and State of Pennsylvania, have invented a certain new and useful Paster for Wrappers and the Like, of which the following is a specification.

The principal objects of the present invention are to provide comparatively simple and reliable mechanism for applying paste in proper limited quantity to the desired portions of moving webs or sheets; to avoid the application of too much paste; to prevent gumming of the paste applying means and their accessories; to provide for delivering paste from a comparatively deep receptacle even when the latter is almost empty; to commercially and successfully feed heated gums or other agglutinants from the bottom of a paste pot to keep the paste agitated, and to provide an improved paster adapted in whole or in part for many uses and purposes, but especially adapted for pasting wrappers or sheets as they are delivered from the wrapper feeder of my application serially numbered 639,577 filed July 20th 1911.

The invention will be claimed at the end hereof, but will be first described in connection with the embodiment of it, which I believe to be the best and which is illustrated in the accompanying drawings, in which—

Figure 1, is a side view, partly in section, illustrating a paster embodying features of the invention. Fig. 2, is a view, with parts removed, looking toward the left hand end of the machine as shown in Fig. 1. Fig. 3, is a transverse sectional view taken on the line 3—3 of Fig. 1. Fig. 4, is a sectional view taken through the various rolls which supply paste and also through the backing roll. Figs. 5, 6, and 7, are views illustrating means for heating or warming the paste, and Fig. 8, is a sectional view illustrating a modification.

In the drawings 1 and 2, are sets of belts spaced apart and suitably driven. The belts receive between them sheets or wrappers, for example, from the suction foot 3, which as well as the mechanism for actuating it are fully described in my application serially numbered 639,577 filed July 20th 1911. The belts run over suitable guide rollers 4, and over pulleys 5 and 6, of which the pulleys 6 are mounted in a swinging frame 7 pivoted at 8. To one side of the belts is arranged a paste pot 9 pivoted at 10. This paste pot 9 is provided near the belts with revoluble paste application rolls 11, spaced between the belts and mounted upon a shaft 12 carried by boxes adjustably secured to the walls of the paste pot. The rolls 11 are provided with a series of circumferential flanges 11<sup>a</sup> spaced apart. The shaft 10 which constitutes the pivot for the paste pot as has been said, is provided with cylindrical paste rolls 13, and is rotated as by means of a sprocket chain 14.

15, are paste feed rolls and they are provided with circumferential flanges 16, which contact with the surface of the paste roll 13, but are arranged opposite the grooves between the flanges 11<sup>a</sup> of the paste application roll 11, in order to apply only sufficient paste thereto. The rollers 15, are revoluble on spindles carried by the wall of the paste pot and by a frame 17. The rollers 13, 15 and 11, are geared together by pin and hole gearing 18, so that they are all positively driven. The backing roll 19, is journaled in the frame 7 and is provided with projecting thin disks 20, spaced apart and arranged opposite the grooves between the projections 11<sup>a</sup> of the paste application roll 11. By this arrangement the backing roll is protected from paste. The swinging frame may be moved against the force of its spring 21, by cams 22 on the shaft 10, which cams operate upon arms 23, projecting forward from the frame 7.

Heat may be applied to the paste in the pot 9. For this purpose the shaft 10 may be made hollow and connected up with a hot water circulating system 24 heated, for example, by means of an electric heater 25 supplied with current by suitable connections as diagrammatically illustrated at 26 in Fig. 5. However, if preferred, the electric heater 27 may be placed in the paste pot 9, as shown in Fig. 6 and connected up with suitable circuit connections, or the electric heater 28 may be applied to the exterior of the paste pot 9, as shown in Fig. 7.

30 is a positively driven cam and it operates on a spring, or otherwise properly controlled, follower 31 and the latter is connected to a rock shaft 31ᵃ, having an arm 31ᵇ connected by an adjustable link 32 with an arm on a rock shaft 33.

An arm 34 on the rock shaft 33 is connected by means of a link 35 with the paste pot 9, thus the cam 30, or more accurately, the high part thereof, serves to tip the paste pot up and bring the paste application roll 11 up to its working position. The connections for working the paste pot from the rock shaft 31ᵃ are the same on each side of the machine and the foregoing description of one set of said connections is sufficient.

In use when the swinging frame 6 is moved into position for bringing the belts 1 and 2 close together, as shown for example in Fig. 1, a wrapper, sheet or web, in the present instance a wrapper a, is fed upward between the belts. The backing roll is carried by the swinging frame so that the rims of its projecting disks 20 are brought into contact with the wrapper a, as illustrated in Fig. 4. At the proper time in respect to the travel of the wrapper a, the paste pot is tipped up and the paste application roll 11 brought into contact with the wrapper a and permitted to remain in contact long enough to apply paste over the desired area of the wrapper. Thereupon the paste pot 9 returns to its original position and the wrapper is carried forward. The fact that the paste application rolls are spaced between the sets of belts enables the wrapper or sheet to be fed forward without bringing the paste into contact with parts of the machine. As shown, the guide rolls 4 are reduced in diameter as at 29, which is a convenient way of causing them to clear the pasted portions of the wrappers or sheets. The various rollers in the paste pot keep the paste agitated and serve to transfer it, even from near the bottom of the pot to the paste application roll. The intermeshing flanges or ribs on the rolls 11 and 15 serve to feed the paste in proper limited quantity and the disks on the backing roll arranged in the manner described between the flanges on the paste application roll, properly support or back up the sheet or wrapper and when the latter has passed or has not yet arrived, are not gummed up with paste. Evidently the spaces between the ribs on the paste feed roll 15 are filled with paste by the paste roll 13 and then the ribs on the paste application roll running in these spaces between the ribs on the paste feed roll have their end portions properly covered with paste, and since the ribs on the backing roll are disposed opposite the spaces between the ribs on the paste application roll, the ribs on the backing roll are not liable to be pasted; thus the pasting operation is properly performed, while at the same time, the paste is agitated and fed up from the bottom of the pot even when the latter is comparatively empty.

The backing roll 19 may be replaced by an air blast 100, and in this case the ribs 11ᵃ, may be omitted. The air blast or the disks 20 constitute means to which paste may not be applied and for holding the paper in contact with the paste application roll.

What I claim is:

1. A paster comprising the combination of belts between which sheets or webs are fed, a swinging frame for positioning one of said belts in respect to the other, spaced revoluble disks constituting a backing roll and carried by said frame, a pivotal paste pot, means for tipping the paste pot, and positively driven intermeshing paste, paste feed and paste application rolls whereof the last two are provided with overlapping flanges, the disks on the backing roll being spaced opposite the spaces between the flanges on the paste application rolls, substantially as described.

2. In a paster the combination of a paste pot, a revoluble cylindrical paste roll mounted in the pot, a revoluble paste feed roll having peripheral flanges running on the cylindrical surface of the paste roll, a revoluble paste application roll having peripheral flanges running in the spaces between the flanges on the paste feed roll, and a backing roll having disk-like flanges opposite the spaces between the flanges on the paste application roll.

3. In a paster the combination of a paste pot, a paste application roll adjustably mounted at the outlet of the pot and having peripheral flanges, a paste feed roll mounted in the pot and having peripheral flanges arranged to run in the spaces between the flanges of the paste application roll, a cylindrical paste roll mounted in the pot and having its surface arranged for coöperation with the flanges on the paste feed roll, and means for revolving said rolls, substantially as described.

4. In a paster the combination of circumferentially ribbed paste application and backing rolls, the ribs of one being arranged opposite the spaces between the ribs of the other and there being space between the ends of the ribs for the passage of a sheet or web.

5. In a paster the combination of a paste pot, a train of rolls arranged in the pot and having pin and hole gearing and whereof one of said rolls is ribless and two of said rolls are provided with overlapping circumferential ribs, and means for driving said rolls, substantially as described.

6. In a paster the combination of a swinging frame provided with a backing roll, a paste pot, revoluble paste rolls in the pot, and a revoluble shaft for driving one of said rolls and provided with cams for operating the swinging frame, substantially as described.

7. In a paster the combination of a paste application roll, backing means spaced clear of the paste application roll, and provisions for holding a sheet or web in contact with the paste application roll substantially as described.

WM. P. SARGENT.

Witnesses:
S. E. PATTERSON,
FRANK E. FRENCH.